May 18, 1965    G. A. SHAFFER, JR    3,184,279
APPARATUS FOR SEALING AND EXHAUSTING
Filed Jan. 16, 1961    7 Sheets-Sheet 1

INVENTOR.
GEORGE A. SHAFFER, JR.
BY
William A. Zalesky
ATTORNEY

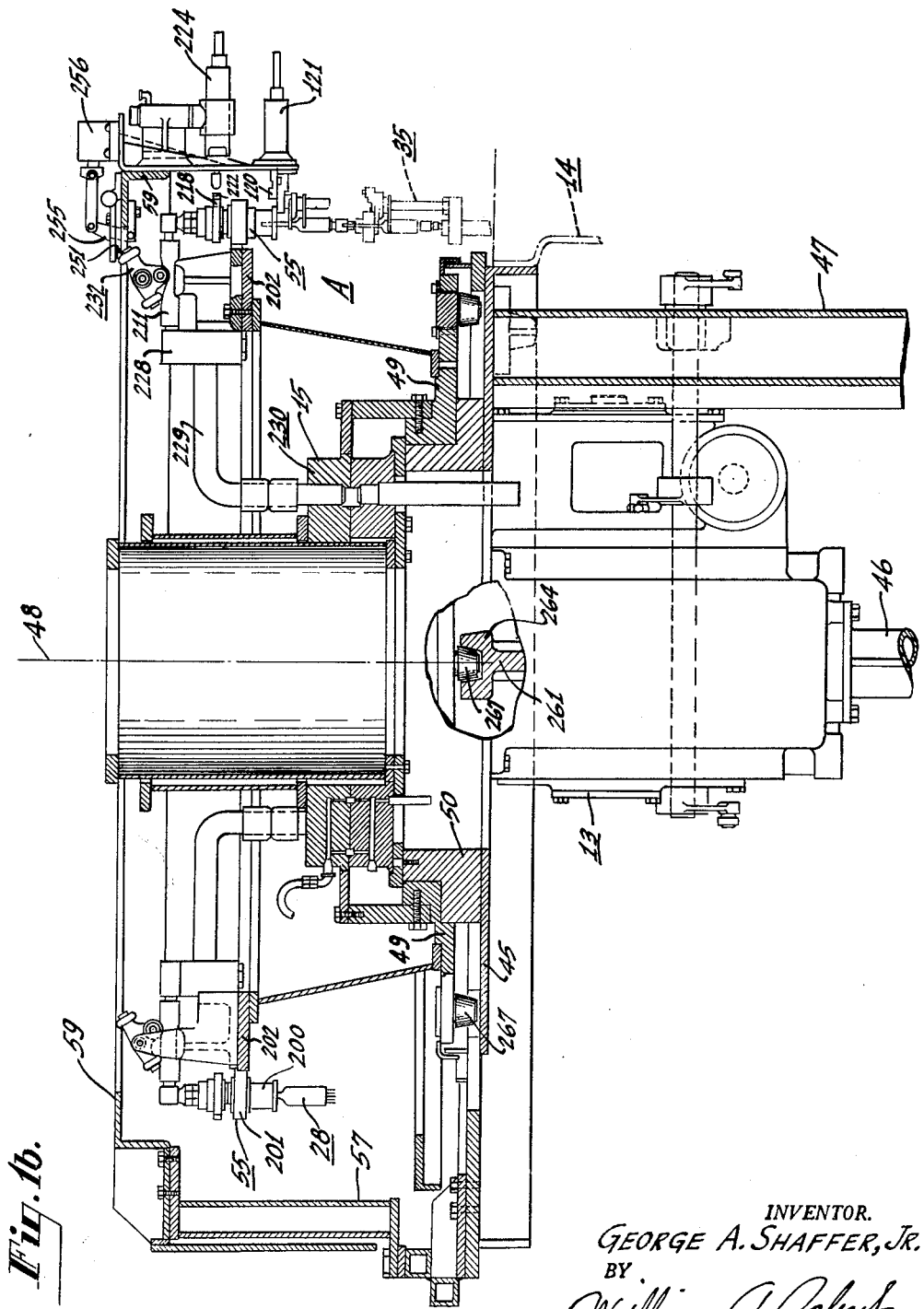

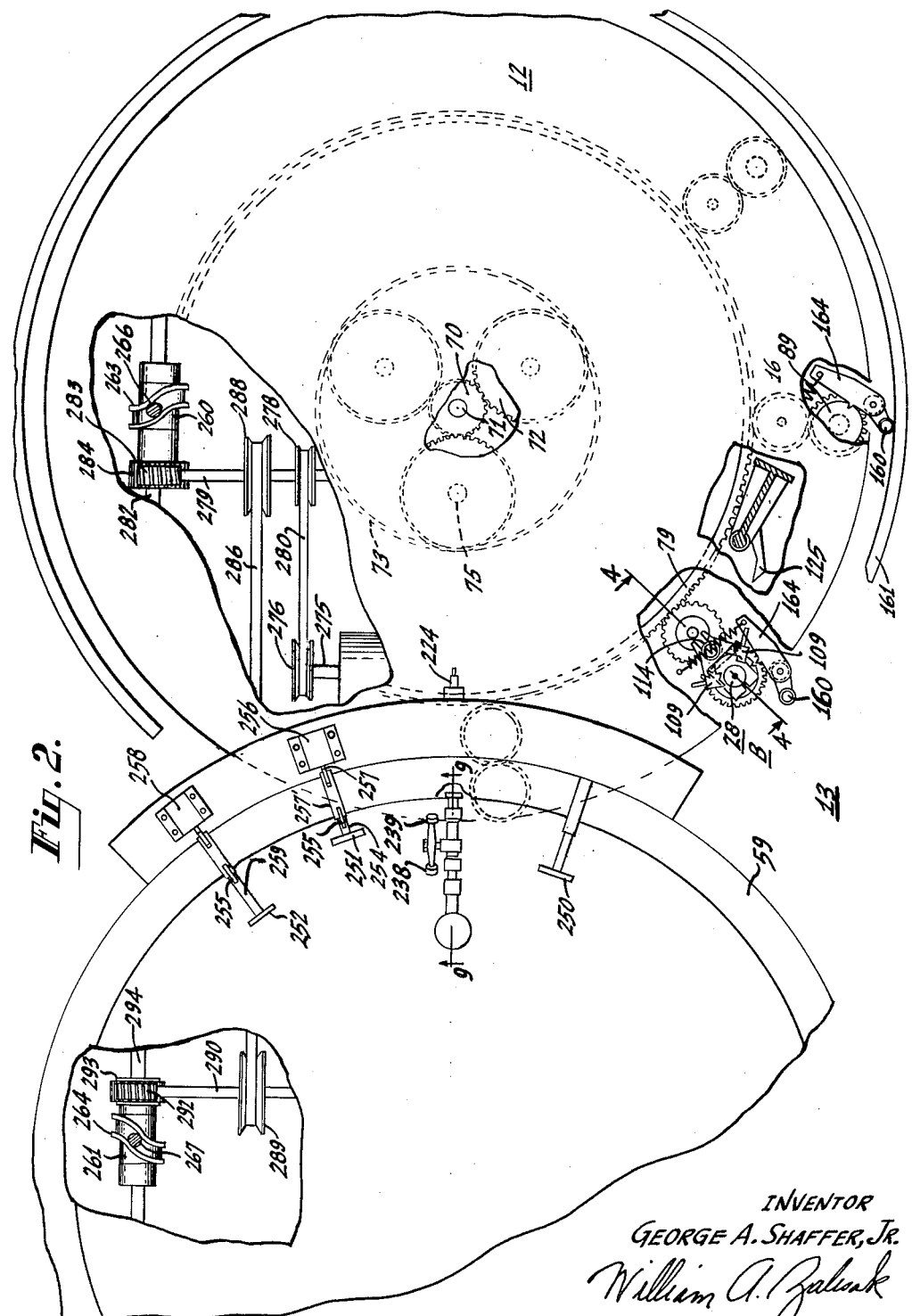

May 18, 1965  G. A. SHAFFER, JR  3,184,279
APPARATUS FOR SEALING AND EXHAUSTING
Filed Jan. 16, 1961  7 Sheets-Sheet 4
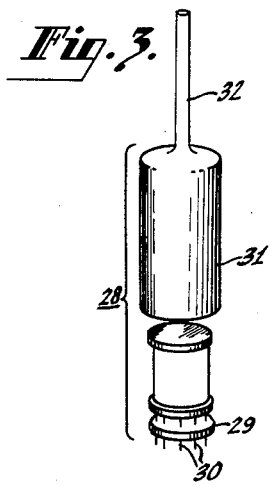
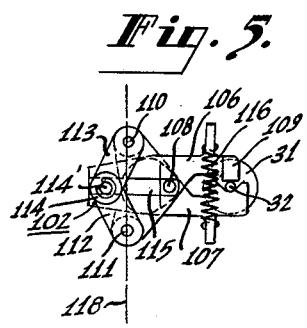
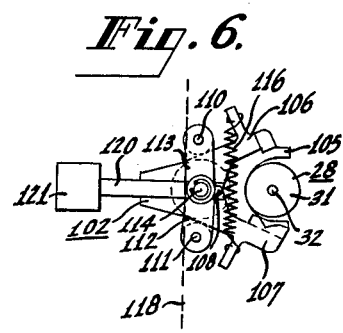
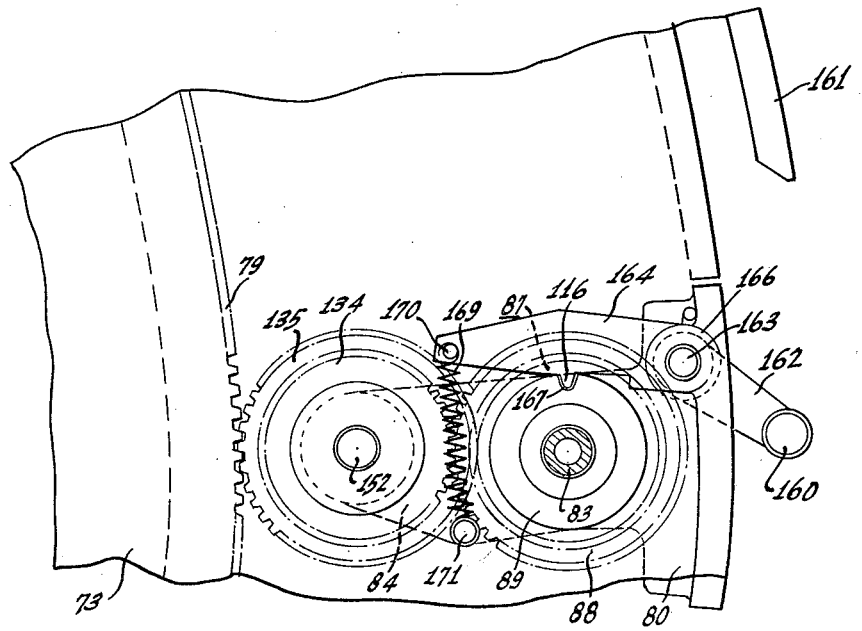
INVENTOR.
GEORGE A. SHAFFER, JR.
BY
William A. Zabrisk
ATTORNEY May 18, 1965  G. A. SHAFFER, JR  3,184,279
APPARATUS FOR SEALING AND EXHAUSTING
Filed Jan. 16, 1961  7 Sheets-Sheet 5

INVENTOR.
GEORGE A. SHAFFER, JR.
BY
William A. Zaleski
ATTORNEY

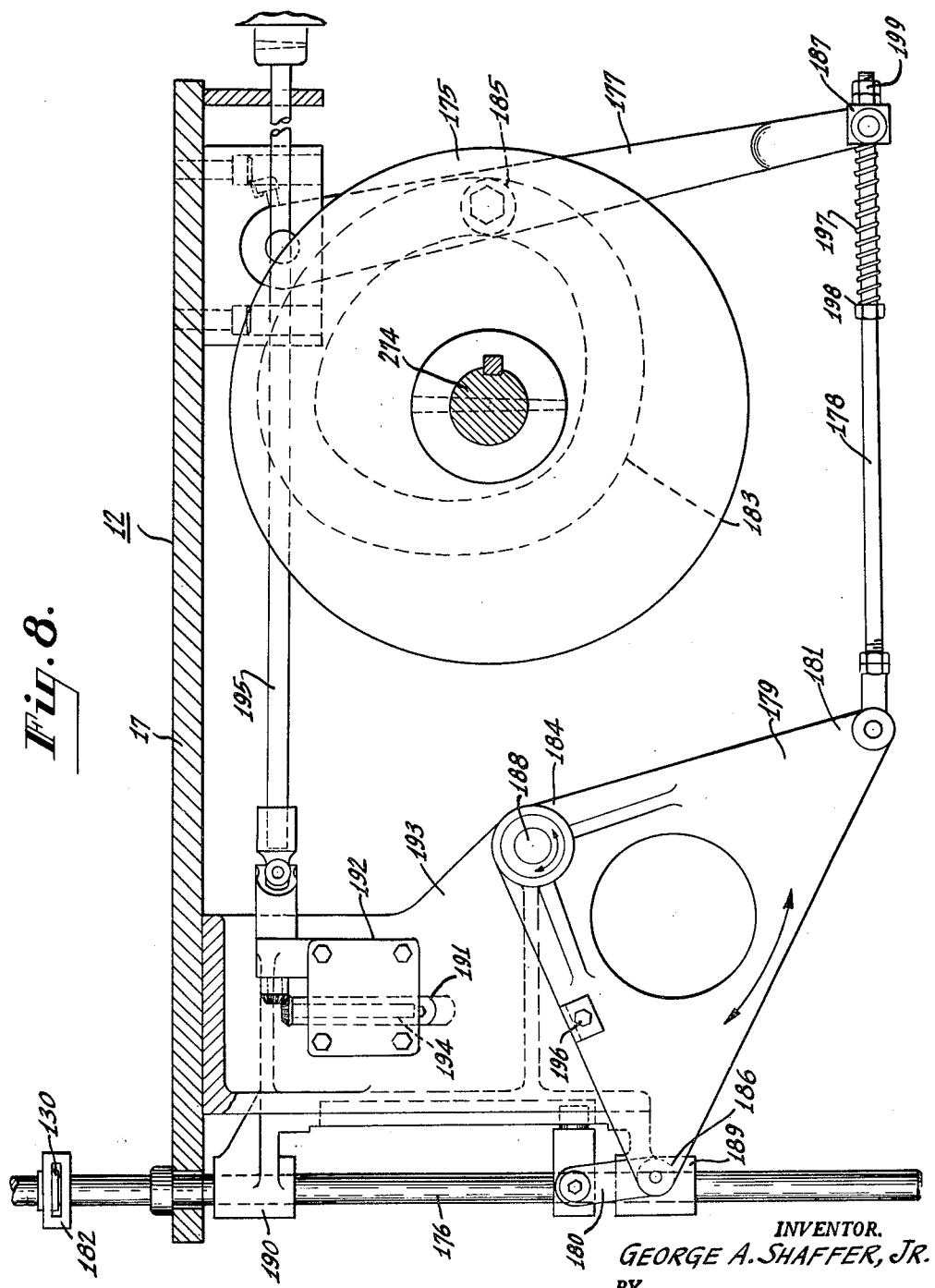

May 18, 1965  G. A. SHAFFER, JR  3,184,279
APPARATUS FOR SEALING AND EXHAUSTING
Filed Jan. 16, 1961  7 Sheets-Sheet 7
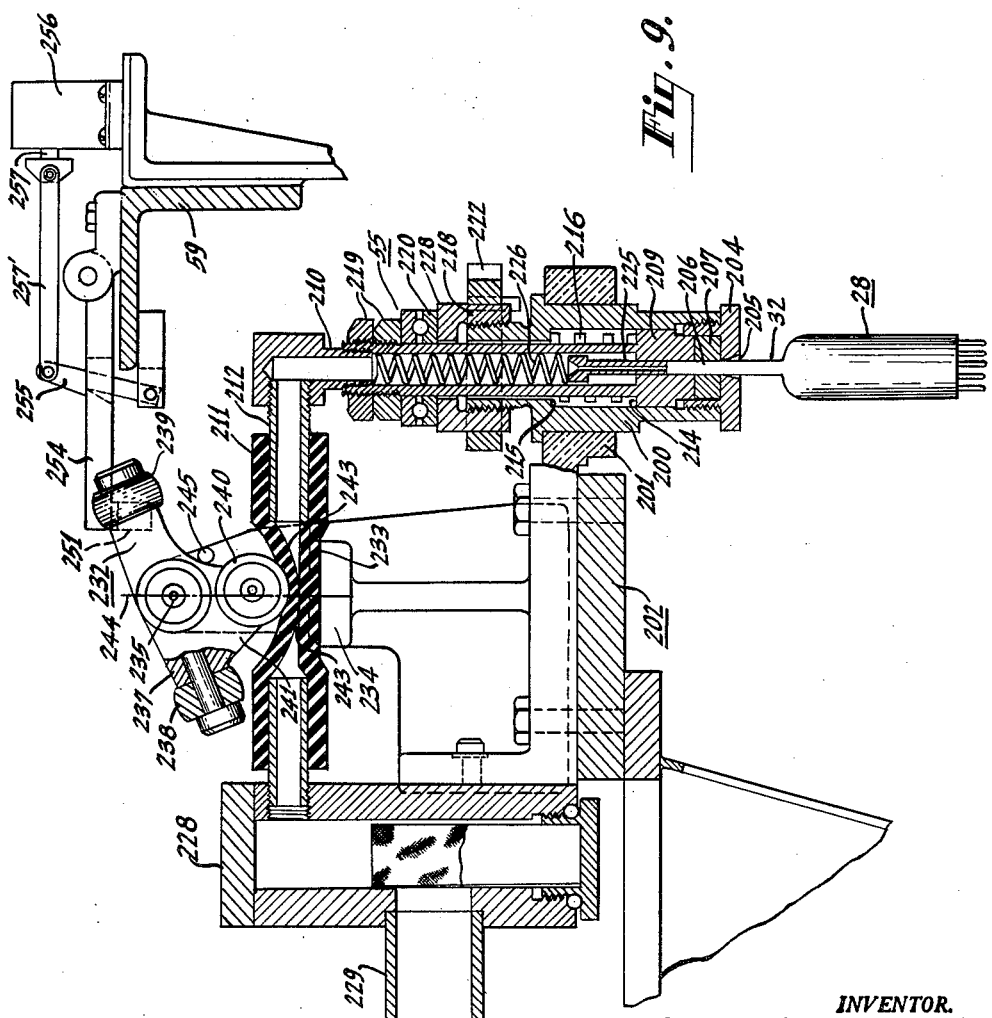
INVENTOR.
GEORGE A. SHAFFER, JR.
BY
William A. Zalenk
ATTORNEY

United States Patent Office 3,184,279
Patented May 18, 1965

3,184,279
APPARATUS FOR SEALING AND EXHAUSTING
George A. Shaffer, Jr., Union, N.J., assignor to Radio Corporation of America, a corporation of Delaware
Filed Jan. 16, 1961, Ser. No. 82,949
14 Claims. (Cl. 316—31)

This invention relates to the manufacture of vacuum tubes and similar hollow evacuated articles and particularly to an apparatus for processing such articles which are to be evacuated and sealed under vacuum.

Vacuum articles to be manufactured according to this invention may include electron tubes, lamps, and the like, which generally comprise an envelope, usually of glass, sealed to a closing header to provide a permanent, closed environment for at least portions of the article. In the manufacture of these articles, the envelope is first sealed to the header, then evacuated. Following evacuation, the envelope may then be back-filled with a suitable fluid through an exhaust tubulation which may be an integral portion of either the envelope or the header. The tubulation is then sealed and tipped off after the evacuation or after the envelope is back-filled.

Many diverse apparatus have been constructed for evacuating and sealing, although in general, modern apparatus for this purpose have been designed to process the articles in two separate successive cycles, with automatic transfer means utilized to transfer the articles from one processing cycle to the other.

One form of apparatus, which has been used extensively in the art, and to which this invention is directed, comprises two separate, adjacently located rotatable turrets, each turret containing a plurality of envelope receiving heads in circumferentially spaced array about its periphery. One turret is used to seal the envelope to the header, and the other used to exhaust, process, and permanently seal off the evacuated envelopes. Automatic transfer means are provided to remove the envelopes one by one from the sealing receiving heads, transfer them to the exhaust and finishing receiving heads, and insert the tubulation into exhaust means therein in vacuum-tight relation. In addition, rotating means are provided to index the turrets to bring the envelopes into successive stations around the circumference of each turret, in order that the envelopes may be acted upon.

The demands for large scale production of such articles utilizing evacuated sealed-off envelopes necessitates the use of processing apparatus capable of high speed, large volume operation. For the most part, these requirements have resulted in the development of such apparatus as described which have been highly complex and hence difficult to service and maintain in continuous operation. Further and in particular, there have been many difficulties with the devices used for transferring and inserting the envelopes into the exhaust heads. In some instances, the envelopes are not only transferred laterally and vertically for tubulation insertion, but are inverted as well. Because of the fragile nature of the glass envelopes and tubulations, however, the slightest misalignment of the complex transfer mechanisms due to the vibration or wear of parts and the like, results in improper insertion of the tubulation and much loss of product due to breakage. In addition, in the prior art apparatus much difficulty is encountered in the process of automatically connecting the tubulation to the exhaust means to obtain a vacuum-tight seal therebetween, and in such a manner as not to break the envelope or tubulation.

A still further problem in many of the prior apparatus is concerned with the rotation of the sealing heads on the sealing turret. To avoid excessive mass of the constantly accelerating and decelerating indexing turret, the sealing head rotating motor is desirably supported independently of the turrets, with pulleys and belts, or the like, used to link the motor to means on the turret to rotate the sealing heads. The result of this is that with each index of the turret, the rotary motion of the turret also rotates the sealing head rotating means mounted on the turret, which rotation adds arithmetically to the rotation of these means as caused by the sealing head motor. Thus, depending upon the direction of rotation of the turret and the sealing heads, the rate of rotation of the latter is either increased or decreased during the indexing of the turret. If decreased, the condition is created whereby the gas flames used to seal the envelopes may overheat and puncture the envelope; whereas if the rate of rotation is increased, the softened envelopes may be bulged outwardly and misshaped under the influence of the increased centrifugal force.

It is, accordingly, an object of this invention to provide novel and improved apparatus for processing articles which are to be evacuated and sealed off.

Still another object of this invention is to provide apparatus of improved construction which is easily serviced and maintained and in which repair, replacement of parts and adjustment of portions of the apparatus is facilitated.

It is another object of this invention to provide such an apparatus having novel and improved transfer means for transferring articles from one portion of the apparatus to another portion for evacuating and sealing these articles with minimum breakage of articles being processed.

A still further object of this invention is to provide improved means for automatically and hermetically locking an article to be evacuated and sealed off to an exhaust head of an exhaust apparatus, and for subsequently ejecting the finished article and related parts thereof from the exhaust head.

A further object of this invention is to provide improved means for rotating the sealing heads of a rotary sealing apparatus and for maintaining relatively constant rate of rotation of the heads during indexing of the turret on which said heads are mounted.

Another object of this invention is to provide evacuating and sealing apparatus of improved versatility and capable of being readily adapted for processing of articles of different sizes.

Although this invention has utility in the manufacture of sundry sealed and vacuum processed articles, it will be convenient to describe a preferred embodiment thereof with reference to the manufacture of but one article such as miniature electron tubes. These tubes comprise a mount assembly having a glass stem which serves as the envelope closing header, and a tubular bulb shelled onto the mount assembly, and which is sealed at one end to the stem. A tubulation for exhausting the electron tube extends from the bulb and opposite the header.

In general, an apparatus embodying this invention comprises two separate vertically spaced and laterally disposed rotatable turrets carrying sealing heads on one turret and exhaust heads on the other. The two turrets are displaced from each other so that the sealing operation does not interfere with the evacuating and tubulation tip-off cycle, but at one point the two turrets overlap each other, with a portion of the one directly over a portion of the other. The purpose of this construction is that after a tube has been sealed on one turret, it may be transferred vertically to be inserted into an exhaust head in the other turret by a simple adjustable transfer mechanism acting in cooperation with means within the sealing head itself.

To facilitate simple direct line transfer of the sealed tubes from the sealing to the exhausting turret in one embodiment of this invention wherein the sealing turret is the lower turret, the exhaust heads are inverted from their usual orientation in the prior apparatus. That is, in accordance with this feature of the invention, the exhaust heads extend downwardly rather than upwardly from the exhaust turret, and the tubes are inserted into the exhaust heads through the undersides of the exhaust heads.

Means are provided to sequentially and synchronously index the rotatable turrets, and in addition, a planetary gear assembly driven by an external driving motor is included in the sealing turret for rotating the sealing heads through novel, adjustable drive mechanisms. As will be described, the purpose of the planetary system, aside from its known advantages as a driving system, is to provide a substantially constant rate of rotation of the sealing heads during the indexing of the sealing turret.

Included in the exhaust heads are compressible port rings which are adapted to receive the tubulation of the tubes. Hollow plunger means are included within the exhaust heads which are forced against a surface of the port ring to uniformly compress and vacuum seal the port ring about the tubulation. Subsequent to the exhausting, sealing and tipping off of the finished article from its tubulation, additional plunger means included within the hollow plunger are employed to eject from the port ring the remaining portion of the severed tubulation.

Further features and objects of this invention will become apparent as this disclosure proceeds with a detailed description of a preferred embodiment taken in connection with the drawing, wherein:

FIG. 1, comprising FIGS. 1a and 1b taken together, with FIG. 1b to the left of and raised slightly over FIG. 1a, is an elevational view, partly broken away and in section, of a composite sealing and exhaust apparatus made according to this invention;

FIG. 2 is a plan view, partly broken away, of the apparatus shown in FIG. 1a and a portion of the apparatus shown in FIG. 1b;

FIG. 3 is an exploded view in perspective of a tube assembly of a type capable of being processed by the apparatus shown in FIGS. 1a and 1b;

FIG. 5 is a plan view of a detail of FIG. 4 and shows a tube of the type shown in FIG. 3 locked within a tube holder;

FIG. 6 is a view similar to that of FIG. 5, except that the tube holder is not locked about the tube;

FIG. 7 is a sectional view taken along line 7—7 of FIG. 4;

FIG. 8 is a left side elevational view of a portion of FIG. 1a showing details of the tube transfer mechanism employed to transfer a tube being processed from the sealing turret to the exhaust turret; and, FIG. 9 is a sectional view along the line 9—9 of FIG. 2.

Figure 1A:
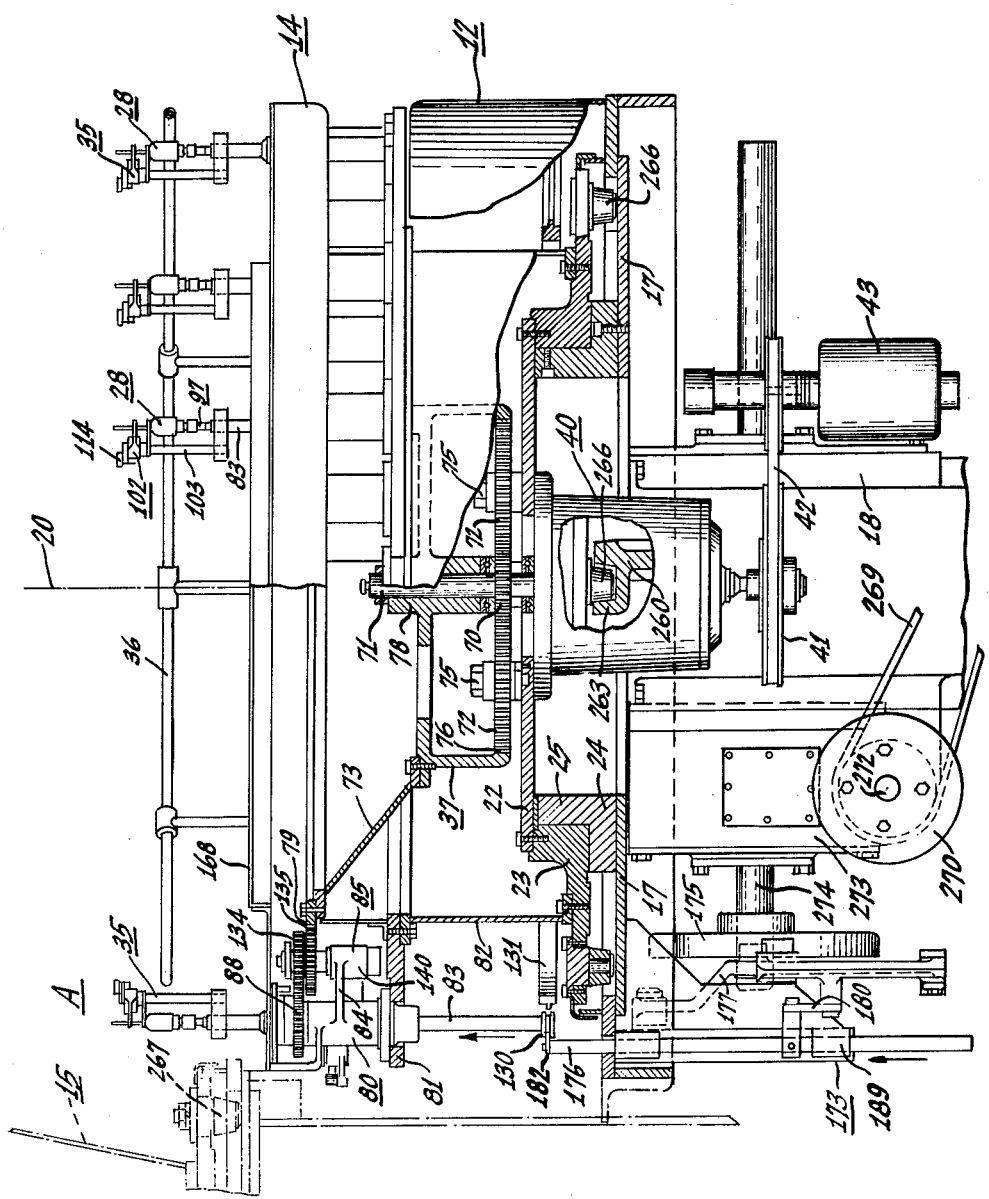

Referring to FIGS. 1a and 1b there is shown a plural turret machine composed of two machine sections 12 and 13. Machine section 12 (FIG. 1a) is employed for fusing or sealing the electron tubes 28, and machine section 13 (FIG. 1b) is employed for exhausting and tipping off the tubes. As shown, each machine section 12 and 13 includes a rotatable turret 14 and 15, respectively, turrets 14 and 15 being so positioned to be in vertically spaced, partially overlapped relationship to each other with turret 13 of FIG. 1b on the left as viewed in these figures. The purpose of the overlapped relationship of turrets 14 and 15, as mentioned hereinbefore, is to allow a simple direct-line transfer of sealed tubes from turret 14 to turret 15.

*Sealing machine*

The machine section 12 shown in FIG. 1a comprises a base plate 17 of heavy steel mounted on a steel pedestal 18 mounted in turn on a plate (not shown) bolted or otherwise secured to the floor. Mounted on the base plate for rotation about vertical axis 20 is the turret 14. Turret 14 comprises a central plate 22 fastened to and supported by annular flange 23 mounted on bearing 24 secured to base plate 17. Bearing 24 serves as a track upon which the rotatable turret 14 rides, bearing 24 having a peripheral lip 25 which overlies the inner margin of the track and which maintains proper positioning of turret 14.

As shown in FIG. 3, an electron tube 28 of the type which may be processed on the apparatus of this invention comprises a stem 29 having a plurality of lead-ins 30 extending therethrough for supporting and making electrical connections to a plurality of tube electrodes mounted on stem 29, and a cylindrical glass bulb 31 having an exhaust tubulation 32 extending longitudinally from one end thereof.

Machine section 12 is used for fusing stem 29 of electron tube 28 to the cylindrical glass bulb 31. To this end, turret 14 is provided with a number of work piece receiving or sealing heads 35 disposed in circumferentially spaced array about the turret 14 periphery. Also provided is a burner tube 36 which encircles most of the circumference of turret 14 and which is mounted on the stationary framework of machine section 12.

Other apparatus mounted on the machine section 13 framework for adjusting the height of the bulb 31 with respect to the stem 29, and the like, are well known in the art and are omitted from the drawing and this description for the sake of simplicity.

Mounted on the central plate 22 for rotation with turret 14 is a planetary gear system 37 for rotating portions of the sealing heads 35, as will be described in detail hereinafter. The planetary gear system is coupled through a gear reduction system, indicated generally by numeral 40, to a pulley 41. Pulley 41 and the gear reduction syster 40 are both mounted on turret 14, and a belt 42 is provided for connecting pulley 41 to a driving motor 43 mounted externally of turret 14.

*Exhaust machine*

The machine section 13 shown in FIG. 1b comprises a support framework including a base plate 45 supported on a steel pedestal 46 and steel legs 47 mounted on a floor plate (not shown). Mounted on base plate 45 for rotation about a vertical axis 48 parallel to vertical axis 20 of turret 14 is the exhaust turret 15. Turret 15 comprises an annular flange 49 which rides on bearing 50 secured to base plate 45. Included on turret 15 are a number of workpiece receiving or exhaust heads 55 mounted in circumferentially disposed array about the turret 15 periphery. In accordance with this invention, each exhaust head 55 is mounted to hang downwardly from the periphery of turret 15, each exhaust head being adapted for receiving the tubulation 32 of a sealed tube 28 through the underside thereof.

Mounted on base plate 45 is an outer stationary support structure 57 which supports thereon an annular top plate 59. As will be seen, the purpose of the support structure 57 and top plate 59 is to provide support for the mechanisms which are employed for actuating the sealing and exhaust heads 35 and 55 in the operation of this invention.

The exhaust cycle comprises indexing the exhaust heads 55 through a succession of high frequency induction coils for outgassing the tube 28 metal parts while simultaneously exhausting the tubes through vacuum pumps to a suitable low gas pressure, energizing the filaments of the tubes to activate the tube cathodes, and tipping off the tubulations 32 to permanently seal off the electron tubes. All of these processes are well known in the art, and for the sake of simplicity, most of the processing mechanisms mounted on the framework of machine section 13 are neither shown nor described.

*Turret indexing*

As shown in FIGS. 1a, 1b and 2, the indexing drive for turrets 14 and 15 includes two indexing barrel cams 260 and 261 having peripheral cam tracks 263 and 264. Each of the cam tracks 263 and 264 is successively engaged, respectively, by a number of cam follower rollers 266 and 267, each group of rollers 266 and 267 being mounted in equally spaced array on the underside of annular flanges 23 and 49. The rollers 266 and 267 follow the cam tracks 263 and 264, the cam tracks having a development such that the rollers are forced along the longitudinal axes of the barrels for providing the prescribed stepwise indexing of the turrets.

Means for driving cams 260 and 261 include a motor (not shown) coupled by belt 269 to pulley 270 (FIG. 1a). Pulley 270 is fixed to shaft 272 which is linked within gear box 273 to a shaft 274 for reasons to be described, and to a shaft 275 (FIG. 2) having a pulley 276 mounted thereon. Pulley 276 drives pulley 278 fixed to shaft 279 by belt 280, shaft 279 driving cam shaft 282 and cam 260 by means of worm gear 283 and worm wheel 284. Synchronous drive of cam 261 with respect to cam 260, and hence synchronous indexing of turrets 14 and 15, is provided by timing belt 286 linking together pulleys 288 and 289 mounted on shafts 279 and 290, respectively. Shaft 290 drives cam 261 through worm gear 292 fixed to shaft 290, worm gear 292 being meshed with worm wheel 293 fastened to cam shaft 294.

*Sealing head spindle rotation*

With reference to FIG. 1a, a more detailed description of the planetary gear assembly 37 will now be given. As mentioned, this gear assembly is mounted on the central support plate 22 of the sealing turret 14, and, as shown, includes a central spindle or sun gear 70 keyed to and driven by shaft 71, a cluster of planet gears 72 (only two shown), and a conical shell 73. The planet gears 72 are mounted for rotation on shafts 75 fixed to central support plate 22, and the gears 72 are meshed with spindle gear 70 and with a ring gear 76 on the inside of shell 73 for transmitting the rotary motion of spindle gear 70 to the shell 73. Shell 73 is supported on shaft 71 by bearing 78, the shell rotating independently of shaft 71. A bull gear 79 is provided on the outside of conical shell 73 whereby the rotary motion of the shell is transferred to rotate tube supporting sealing spindles 83 mounted within the sealing heads 35, as will be described hereinafter. Shaft 71 is coupled to pulley 41 through the gear reduction system 40, pulley 41 being rotated by the driving motor 43 mounted externally of turret 14.

It is noted that the rate of revolution of the sealing spindles 83 is affected by the indexing of the sealing turret 14. That is, in order to provide rotation of each of the sealing spindles 83 about the longitudinal axis thereof, it is necessary that pulley 41 be rotated with respect to turret 14. Mere rotation of pulley 41 along with rotation of turret 14 produces no relative motion of the parts within the gear system mounted on the turret, and hence no axial rotation of the spindles.

For providing axial rotation of the spindles 83, pulley 41 is rotated by belt 42 driven by the motor 43 mounted externally of turret 14, the rate of rotation of pulley 41 with respect to a fixed point off the rotating turret being a function solely of the speed of the motor 43. During the time the turret is at rest between indexes, the relative rate of rotation of pulley 41 with respect to turret 14 is equal to the rotational speed of the pulley. During indexing of the turret, however, the relative rotational rate between the pulley and the turret is changed by an amount equal to the rate at which the turret is rotatably indexed. If the turret is indexed in the same direction as the rotation of the pulley, the turret will tend to "catch" up to the pulley and reduce the relative rotational rate therebetween. If the direction of turret indexing is opposite to the direction of pulley rotation, the rotational rate differential will be increased. In either event, the rate at which the sealing spindles are rotated by pulley 41 will be changed each time turret 14 is indexed.

As already suggested, changes in the rate of revolution of the sealing head spindles are undesirable. In the prior art apparatus, the tube envelopes are heated by gas flames at individual stations spaced around the sealing turret 14, but allowed to cool in the regions between stations as the sealing turret is indexed. This is an inefficient and time-consuming operation since the heat lost between stations must be re-added at each successive station before the bulb-stem fusing process may proceed. To remedy this, it is desirable to heat the envelope continuously throughout the entire sealing cycle and to eliminate the wasteful cooling periods.

Because of the time it takes to transfer the sealed tubes 28 from the sealing turret 14 to the exhaust turret 15, however, it is necessary to provide an intermittent rather than continuous rotation of the turrets. Thus, if gas flames were played on the tubes between the stations for heating the tubes continuously, overheating and possible puncture of portions of the glass envelope would occur if the rate of revolution of the sealing heads were significantly decreased each time the turret 14 were indexed. Alternatively, if the spindles were suddenly rotated materially faster, the softened glass envelopes would be misshaped and bulged outwardly under the effects of the increased centrifugal force.

In accordance with a feature of this invention, the rate of revolution of the sealing head spindles 83 is maintained at a relatively constant rate in spite of the indexing of the turrets in order that continuous bulb-stem heating and fusing may be utilized. To accomplish this, pulley 41 is driven by the drive motor 43 at a rate much faster than the instantaneous indexing speed of the turret 14, and the high rate of rotation of pulley 41 is geared down by the gear reduction system 40, the planetary gear system 37, and the gear system included within each sealing head 35 (to be described) to rotate the sealing head spindles at the relatively slow rate required in the sealing operation. In this manner, the change in the rate of revolution of pulley 41 with respect to turret 14 caused by the indexing of the turret is reduced to a small percentage of the fundamental rotational rate differential between the tow. The small percentage change in the relative turret and pulley speeds causes therefore only a correspondingly small variation in the rate of revolution of the sealing head spindles.

In one embodiment of this invention, for example, the maximum instantaneous rate of rotation of turret 14 during indexing is 100 r.p.m. The gear ratio between pulley 41 and each of the sealing spindles 83 is ten to one, and the desired rate of rotation of the sealing spindles for proper bulb-stem sealing is 100 r.p.m. Thus, to rotate the sealing spindles at 100 r.p.m., it is necessary to rotate pulley 141 at 1000 r.p.m. During pauses between turret indexes, therefore, pulley 41 rotates at a rate of 1000 r.p.m. with respect to turret 14 and sealing spindles 83 are rotated at the desired rate 100 r.p.m. During turret indexing, the rotational rate differential between the pulley and the turret is affected by the rotation of the turret, as described, and the maximum instantaneous change in the rotational rate differential is 100 r.p.m. Depending upon the relative directions of rotation of the pulley 41 and the turret 14, the minimum or maximum rotational rate differential between the two will be either 900 or 1100 r.p.m., and the maximum spindle rotational variation will be only plus or minus 10 r.p.m. from the desired sealing speed of 100 r.p.m.

It has been found that such small variations in the rate of rotation of the sealing spindles are sufficiently small so as to avoid damages to the tube electrodes.

*Sealing heads*

As shown in FIG. 1a, a sealing head 35 for supporting a tube 28 to be sealed comprises an outer housing 80 securely mounted to turret 14 by a clamp 81 bolted to bracket 82 fastened to annular flange 23. Housing 80 slidably and rotatably supports the sealing spindle 83 therein. Also, a bracket 84 extends from housing 80 for supporting a spindle driving clutch mechanism 85.

Figure 4:
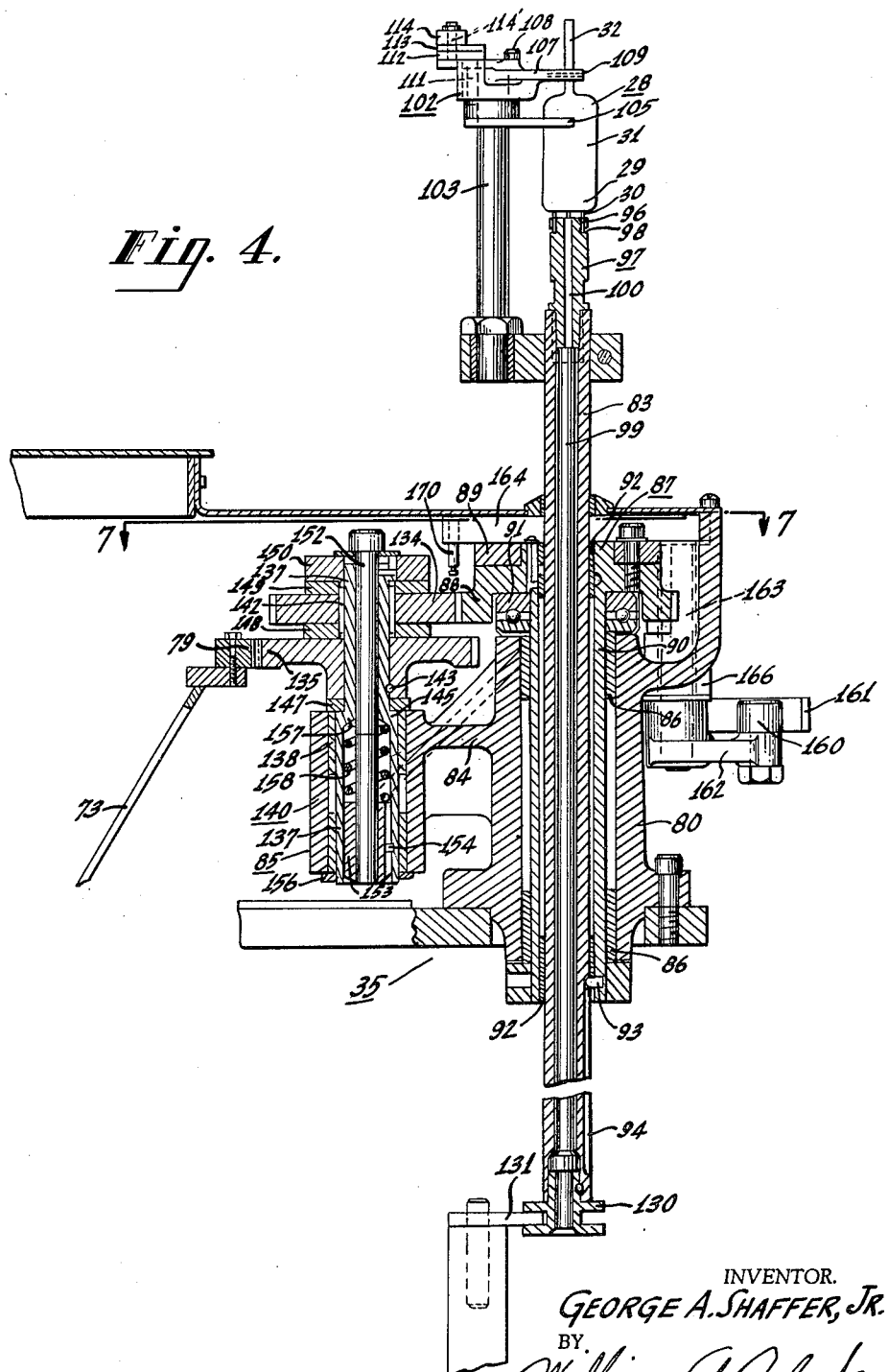
FIG. 4 is a sectional view along the line 4—4 of FIG. 2 and shows a cross-section of a sealing head used in this embodiment of my invention.

An enlarged view of the sealing head 35 is shown in FIG. 4. Rotatably mounted within housing 80 by bearings 86 and 91 is a head gear 87 which includes as portions thereof a gear ring 88, a head collar 89, and a hollow shaft 90. The sealing spindle 83 is slidably supported within hollow shaft 90 by bearings 92 and is keyed to this shaft by key 93. Spindle 83 has a longitudinally extending slot 94 therein in which key 93 is slidably engaged, whereby spindle 83 may slide axially of shaft 90, while rotation of gear ring 88 and shaft 90 causes rotation of the sealing spindle 83.

The upper end of spindle 83 terminates in sealing pin 97 on which an electron tube 28 is positioned to be sealed. Sealing pin 97 is provided with a number of apertures 96 adapted to receive the lead-ins 30 of the electron tube. The apertures 96 terminate at shoulders 98 on which the lead-ins rest, whereby the stem 29 of the tube is positioned slightly above the end of sealing pin 97. The purpose of this is to allow air from sources, not shown, to be supplied through central bores 99 and 100 in spindle 83 and sealing pin 97, respectively, to set the proper glass strain patterns in the stem as described in United States Patent No. 2,296,579 to H. R. Seelen for "Glass Envelope Seals."

Although not so shown, the apertures 96 in sealing pin 97 are spaced around a circle on the end of the sealing pin 97 to correspond to the spacing of the lead-ins 30, thereby allowing insertion of the tube lead-ins into the apertures in but one predetermined tube angular orientation. This is necessary to insure that the tube lead-ins electrically connected to the tube filaments make proper contact to electrical energy sources for energizing the filaments during tube exhausting, as previously mentioned. Since the tubes are transferred automatically from the sealing turret to the exhaust turret, it is convenient to properly orient the tube lead-ins when the tube is first loaded onto the sealing turret and to maintain this orientation thereinafter.

For supporting a tube 28 on sealing pin 97, holder 102 is provided mounted on a support rod 103 clamped to sealing spindle 83. As shown in FIGS. 4, 5, and 6, holder 102 comprises a fixed C-shaped locator 105 for engaging and orienting the bulb 31 of the tube 28, and a pair of arms 106 and 107 pivoted about pin 108. The ends of arms 106 and 107 are adapted to form a pair of jaws 109 for firmly locking the tubulation 32 of a tube therebetween. Rotatably fixed to the other end of arms 106 and 107 by pins 110 and 111 are levers 112 and 113 which are pivotally joined together by roller 114 mounted on shaft 114'. Arms 106 and 107 can be rotated about pin 108 to open or close jaws 109 and 110 by disposing roller 114 inwardly or outwardly of a groove 115 (FIG. 5) within holder 102 by means to be described. Extending between arms 106 and 107 and tending to force pins 110 and 111 of arms 106 and 107 towards each other is spring 116. The effect of spring 116 is to lock arms 106 and 107 either opened or closed about tubulation 32. That is, with roller 114 to the left of axis 118 as shown in FIG. 5, spring 116 tends to maintain jaws 109 clamped shut. When roller 114 is forced to the right of axis 118, as by plunger 120 of air cylinder 121 shown in FIGS. 1b and 6, spring 116 is stretched as the rotation of levers 112 and 113 tends to force pins 110 and 111 apart. Then, as roller 114 passes to the right of axis 118, continued rotation of levers 112 and 113 tends to bring pins 110 and 111 together, spring 116 now aiding in the forward motion of roller 114. Roller 114 comes to the end of groove 115, however, and is prevented from proceeding further. When plunger 120 is retracted, roller 114 remains forced against the end of groove 115 by the tension of spring 116, and jaws 109 are locked in their open position.

The means for closing jaws 109 is shown in FIG. 2, and comprises a track 125 suspended to hang downwardly from the machine section 12 framework in the path of roller 114. As a sealing head 35 is indexed under and past this track, roller 114 engages the track and is forced to follow the development thereof. The displacement of roller 114 outwardly of groove 115 causes jaws 109 to close.

For regulating the height of the sealing spindle 83 within the housing 80, the lower end of the sealing spindle, as shown in FIG. 4, terminates in guide 130 which engages track 131. Track 131 is fastened to the machine section 12 framework (FIG. 1a), and regulates the sealing spindle height with respect to the burner tube 36 at all stations around the periphery of the sealing turret 14 except the loading station. At this latter station, as will be described hereinafter, guide 130 disengages track 131 and engages instead a transfer device for elevating the sealing spindle 83 to transfer the sealed electron tube to the exhaust turret.

During certain portions of the travel of the sealing heads 35, it is necessary, for reasons which will become clear hereinafter, that the rotation of the sealing spindles 83 be discontinued. To accomplish this, a clutch mechanism 85 is provided, as shown in FIGS. 1a and 4.

The clutch mechanism 85 is mounted within a subhousing 140 secured to housing 80 by bracket 84, and comprises a gear 134 meshed with gear ring 88, and a spindle gear 135 meshed with and driven by the outer bull gear 79 of shell 73. Gears 134 and 135 are mounted on a hollow shaft 137 journalled within bearings 138 within subhousing 140, gear 134 being rotatably supported on shaft 137 by bearings 142, and gear 135 being keyed to the shaft 137 by pin 143. Shaft 137 has an external shoulder 145 on which thrust washer 147 bears, which, along with fiber spacers 148 and 149, and collar 150, space and maintain gears 134 and 135 along the shaft 137. This entire assembly is held together by bolt 152 which runs through the central hollow portion of shaft 137. Nut 153 is threaded to the end of bolt 152 and is connected to shaft 137 by a key 154. A retaining ring 156 is fastened to the end of shaft 137 to secure shaft 137' within subhousing 140. Included within the hollow shaft 137 and positioned between nut 153 and an internal shoulder 157 of shaft 137 is a spring 158 for providing compression of the elements mounted on shaft 137 against one another.

In operation, gear 135 is driven continuously by the planetary system outer bull gear 79. Gear 135 is frictionally coupled to gear 134 by fiber spacer 148 positioned between the two gears, and gear 134, as described, drives the spindle 83 through head gear 87. During the portions of the travel of the sealing heads wherein it is desired to stop the rotation of spindle 83, head gear 87 is locked by means to be described, and fiber spacer 148 permits slippage between gear 134 and the continuously rotating gear 135.

For proper operation of this clutch mechanism, it is necessary that the friction fit between gears 134, 135 and the fiber spacers 148 and 149 be tight enough to provide rotational coupling between gears 134 and 135, but loose enough to permit slippage between the gears and the spacer without causing excessive wear of the fiber spacers. Moreover, since fiber spacers 148 and 149 will wear to some extent during continued operation, and because the clutch mechanism parts will expand due to their gradual heating by the sealing flames during initial machine warm-up and subsequent machine operation, it is desirable that the friction coupling between gears 134 and 135 be readily adjustable.

An important feature of the machine allows such adjustment to be readily obtained. As already mentioned, the tension of spring 158 determines the compression between all the elements mounted on shaft 137 between collar 150 and nut 153. Thus, to adjust the compression between gears 134 and 135 and fiber spacers 148 and 149, bolt 152 is screwed into or out of nut 153. Furthermore, the entire clutch assembly may be removed and replaced within subhousing 140 merely by unfastening retaining ring 156 from the end of shaft 137 and lifting shaft 137 out of subhousing 140.

As shown in FIGS. 4 and 7, the locking mechanism for preventing rotation of head gear 87 and spindle 83 comprises a roller 160 which engages a track 161 fastened to the machine section 12 framework and which extends around most of the periphery of the sealing turret. Roller 160 is connected by a lever 162 to the lower end of a rotatable shaft 163 journaled within a bearing 166 attached to housing 80. The upper end of shaft 163 is fixed in turn to a rocker arm 164. Attached to rocker arm 164 is a key 165 shaped to fit a groove 167 in the edge of head collar 89 of head gear 87. The rocker arm 164 is biased inwardly of the periphery of head collar 89 by a spring 169 fastened to a pin 170 on the end of rocker arm 164 and to a pin 171 extending from housing 80.

While roller 160 is engaged to track 161, as shown in FIG. 2, rocker arm 164 is pivoted away from head collar 89 thereby permitting rotation of the head collar along with spindle 83. Between the sealing turret loading and unloading stations, however, track 161 has a discontinuity wherein roller 160 disengages the track allowing spring 169 (FIG. 7) to contract and to force key 165 against head collar 89. Key 165 enters groove 167 on head collar 89 when the groove is rotated opposite the key, and further rotation of head gear 87 and spindle 83 is prevented.

It is noted that the clutch mechanism 85 is located somewhat below sealing pin 97 and beneath a turret covering plate 168 (FIG. 1a). The purpose of this is to prevent heating of the clutch by the tube sealing flames as much as possible to minimize thermal expansion of the clutch parts. The temperature of the sealing flames along with the equilibrium temperature of the sealing machine section 12 varies with changes in the machine environment, and excessive variation in the temperature of the clutch would necessitate frequent adjustments in the friction fit between gears 134 and 135 therein.

*Transfer mechanism*

At the conclusion of the sealing cycle, a sealed electron tube 28 arrives at the last station on the sealing turret 14 from which it is transferred upward into an overhanding exhaust head 55.

As shown in FIG. 1a, the elevating transfer mechanism 173 is mounted on the machine section 12 framework beneath base plate 17. As shown in greater detail in FIG. 8, the transfer mechanism 173 comprises a driving cam 175, an elevating shaft 176 and a series of linkages 177–180 for converting the cam 175 rotary motion to a straight-line vertical motion of shaft 176. Shaft 176 terminates at its upper end in transfer block 182 which engages guide 130 at the end of the sealing spindle 83. Upward motion of shaft 176, as will be seen, results in the desired vertical transfer of the electron tube.

Cam 175 is mounted on and driven by shaft 274 which is part of the turret indexing cam arrangement shown in FIG. 1a, as described. In this manner, synchronism between the indexing of the turrets 14 and 15 and the transfer of the fused tubes is provided.

Referring particularly to FIG. 8, cam 175 is shown having a cam track 183 engaged by a follower roller 185 fastened to lever 177. Lever 177 is pivotally supported at one end to the machine frame and rotation of cam 175 results in pendulum-like motion of this lever. The other end of lever 177 is provided with a joint 187 for slidably and rotatably connecting lever 177 to link 178 pivotally fastened in turn to one apex 181 of a triangular transfer lever 179. Transfer lever 179 is pivoted at a second apex 184 about shaft 188 fastened to bracket 193 extending downwardly from the machine section 12 framework. The third apex 186 of transfer lever 179 communicates with the shaft 176 through pivotable connecting link 180. Shaft 176 is journalled within bearings 189 and 190 fastened to bracket 193, and the motion of shaft 176 is restricted to a vertical displacement along the longitudinal axis of these bearings.

In accordance with a feature of the present invention, adjustable stop means and spring take-up means are provided for facilitating adjustment of the transfer mechanism whereby it is possible to change the apparatus of this invention from the processing of tubes of one length to tubes of another length.

The adjustable stop means comprise a rod 191 which extends outwardly from a housing 192 fastened to bracket 193. Rod 191 is fastened to screw 194 threaded within housing 192, and the length which rod 191 extends from bracket 192 may be varied by screwing screw 194 inwardly or outwardly of housing 192 by means of lever 195. Rod 191 is positioned to come into contact with a stop 196 on transfer lever 179 when the latter is rotated clockwise for limiting the length of travel of triangular transfer lever 179.

The spring take-up means comprise a spring 197 located between joint 187 and a collar 198 fastened on link 178. As lever 177 is rotated clockwise due to the rotation of cam 175, spring 197 is compressed and drives link 178 forward along with the other levers to elevate shaft 176. When stop 196 encounters rod 191, transfer lever 179 is prevented from further rotation, and spring 197 is further compressed to take-up all further advance of lever 177.

On the return stroke, connecting joint 187 engages a nut 199 fastened to link 178 and retracts the levers and lowers shaft 76. Thus, with the development of cam track 183 selected to produce a stroke of shaft 176 long enough to transfer sealed tubes of a short length, all longer tubes requiring shorter transfer strokes may be accommodated simply by adjusting the length of rod 191 to allow transfer lever 179 to travel through only the shorter arcuate distance required, spring 197 taking up the extra motion of lever 177 produced by cam 175.

*Exhaust head*

At the end of the sealing cycle, a sealed electron tube arrives at the unloading station on the sealing turret from which it is transferred, by means already described, into an exhaust head suspended from the exhaust turret.

With reference to FIGS. 1b and 9, an exhaust head 55 is shown which comprises an outer retainer 200 rigidly mounted in a clamp 201 fastened to exhaust turret 15 by means of bracket 202 mounted thereon. Closure collar 204 is screwed to the bottom end of retainer 200 and provided with a tapered aperture 205 therethrough for guiding the tubulation 32 of an electron tube being transferred into the central bore 206 of a rubber port ring 207.

To prevent the electron tube from falling out of the port rubber ring and to provide a hermetic fit therebetween for exhausting the electron tube, hollow plunger 209 is provided for compressing the rubber ring to squeeze it tightly about the tubulation. Plunger 209 is slidably supported within retainer 200 and is threaded onto elbow 210 fastened in turn to flexible exhaust hose 211 by hose connector 212.

Located between an external shoulder 214 of plunger 209 and an internal shoulder 215 of retainer 200 is a spring 216, which, in cooperation with clamp 218, lock nuts 219 and split bearing 220, determines the pressure of plunger 209 on rubber port ring 207. Clamp 218 is rotatably threaded onto retainer 200 and includes as parts thereof an extending wing 222 for rotating the clamp 218, and a top collar 223 for engaging the lower portion of the split bearing 220. Plunger 209 is slidably journalled within top collar 223 and bearing 220, while nuts 219 are fastened to the plunger in locked position.

Thus, when clamp 218 is screwed upwardly by means hereinafter described, its upward motion on the fixed retainer 200 exerts pressure on nuts 219 through bearing 220 to elevate plunger 209 within fixed retainer 200. The upward movement of the plunger away from the rubber port ring 207 decompresses the ring while simultaneously compressing spring 216 between shoulders 214 and 215. When clamp 218 is screwed downwardly, spring 216 forces plunger 209 downwardly against port ring 207 and compresses it about a tubulation 32 therein. Hose 211 flexes to permit the movement of plunger 209 within the fixed retainer 200.

It is noted that because bearing 220 is positioned between clamp 218 and nuts 219 fixed to plunger 209, the rotation of clamp 218 is not transmitted to nuts 219. That is, the lower portion of bearing 220 rotates with clamp 218, while the upper portion thereof transmits only the upward movement of clamp 218 to nuts 219. The result of this is that plunger 209 is translated upwardly and downwardly within retainer 200 without any rotation of the plunger. The advantage to this is that the rubber port ring 207 is thus evenly compressed between flat surfaces on the end of plunger 209 and the inside of closure collar 204, thereby avoiding the breakage of the fragile electron tube tubulations that often occur in the prior art apparatus due to the canting of the rubber ports by uneven or rotary compressing forces.

At the exhaust turret unloading station, clamp 218 is rotated clockwise to decompress rubber port ring 207, while at the loading station, the clamp is rotated counter-clockwise to recompress the rubber port. Only a small displacement of the plunger is actually required to accomplish this, and clamp 218 need therefore be rotated through only a small arcuate distance.

Air cylinders 224, such as the one shown in FIG. 1b, are provided at the exhaust turret loading and unloading stations for rotating clamp 218. The air cylinders are suspended from the annular top plate 59 on machine section 13, and are so positioned that when their plunger shafts are driven outwardly from their cylinders, the plungers strike against and rotate the wings 222 of clamps 218 in the desired direction. The air cylinders are controlled by known means (not shown) which may include solenoid operated valves to direct the flow of air into the air cylinders, and micro switches activated by cams on the turret indexing cam shafts for energizing the solenoids at the proper instant during each turret index.

It is noted that a feature of this construction is the ease with which the port rubber compression means may be adjusted. During extensive operation of the machine, the rubber port rings must be replaced frequently due to their wear by the repeated tubulation insertions. The new port rubbers, however, may be of different size than the ones replaced, and in order to have proper compression thereof, adjustments have to be made. In accordance with another feature of this invention, these adjustments may be made simply by loosening the locked nuts 219 on plunger 209, screwing plunger 209 either upwardly or downwardly on elbow 210 to relocate the plunger within retainer 200 with respect to the new port rubber, and then relocating the locked nuts 219 on plunger 209 for proper engagement with split bearing 220 and clamp 218.

At the conclusion of the exhaust cycle, the electron tube is sealed, tipped off from its tubulation, and is unloaded by any known means from the exhaust turret. A portion of the tubulation remains in the exhaust head, which prior to the loading of another sealed tube, must be removed along with any glass particles broken off from the tubulations.

To accomplish this, there is provided within plunger 209 a slidably supported hollow plunger 225 along with a spring 226. Spring 226 tends normally to bias plunger 225 to extend outwardly of plunger 209 to the outer edge of bore 206 within port rubber 207.

However, when an electron tube tubulation 32 is inserted into the port rubber 207 by the transfer mechanism as previously described, plunger 225 is forced inwardly of plunger 209 resulting in the compression of spring 226. To prevent premature ejection of the tubulation, plunger 209 is actuated downward to compress rubber ring 207 prior to the retraction of the transfer mechanism shaft. At the end of the exhaust cycle the rubber ring is decompressed and compressed spring 226 causes plunger 209 to eject the portions of the remaining tubulation.

A further feature of the inverted exhaust head construction, it is noted, is that the force of gravity is employed to facilitate the elimination of small glass particles which, in the prior art apparatus, tends to collect in the heads and interfere with the hermetic sealing of the tubulations within the exhaust port rubbers.

Exhaust of the electron tubes takes place through tubulation 32, through the bores in rubber ring 207 and hollow plungers 209 and 225, through elbow 210, flexible hose 211, exhaust block 228 and thence through duct 229 to rotary sweep valve means 230 (FIG. 1b) and to commercially available exhaust pumps (not shown). Separate stationary pumps of different capacity and efficiency are employed, and the rotary sweep valve means, the operation of which are well known, permit the connection of the exhaust heads to each exhaust pump in turn to first rough exhaust the electron tube, and then to successively evacuate it to a lower gas pressure as the exhaust heads are successively indexed through the exhausting cycle. To prevent overloading and possible damage to the more sensitive of these pumps, pinch-off means are provided to isolate the pumps from any exhaust heads which have not received a sealed tube from the sealing turret, or from heads containing tubes which are not properly hermetically sealed from atmospheric pressure.

These hose sealing pinch-off means (FIG. 9) comprises a rocker 232 for collapsing a wall section 233 of flexible hose 211. This section of hose 211 rests on a stop 234 extending from bracket 202. Mounted above this portion of the hose and adapted to compress it against the stop 234 is the rocker 232. Rocker 232 is pivotally fastened to bracket 202 by shaft 235, and comprises an arm 237 having rollers 238 and 239 at each end thereof, and a compression roller 240 rotatably mounted on the end of an extension 241 of arm 237. When rocker 232 is rotated counter-clockwise, compression roller 240 engages and collapses the walls of hose section 243 against stop 234, as shown, thereby hermetically sealing hose 211. Extension 241 is rotated past the center line 244, and the upward force exerted by the compressed resilient hose walls locks rocker 232 in the hose clamped position with extension 241 jammed against stop 245 mounted on bracket 202. Clockwise rotation of rocker 232 unseals the hose.

As shown in FIGS. 2 and 9, mechanisms for actuating rockers 232 comprise tracks 250, 251 and 252. These tracks are supported from the annular top plate 59 and extend along a length of the paths of roller 238 or 239. The tracks have downwardly extending developments for causing rotation of rockers 232 either clockwise or counterclockwise upon engagement of roller 239 or 238, respectively, to the tracks.

Track 250 (FIG. 2) is fixed in the path of roller 238, and the rockers 232 of all the exhaust heads 55 passing this track are rotated counterclockwise to seal hoses 211.

As shown in FIG. 9, track 251 is mounted on a pivotable shaft 254. Shaft 254 may be locked in horizontal position by latch 255 rotatable by lever 257' and plunger 257 of solenoid 256. Track 252 is similarly provided with pivoting and locking means.

Although not shown, means are provided for determining whether a sealed tube has been loaded into each exhaust head 55 and whether the loaded exhaust heads are sealed from the atmosphere. If a tube has not been loaded into an exhaust head 55, solenoid 256 is energized to withdraw plunger 257 therein to free shaft 254 for upward rotation. Thus, as the rocker 232 of a non-loaded exhaust head is indexed past track 151, the track merely rides up and out of the path of roller 239, rocker 232 remaining in its hose clamped position. When an exhaust head is loaded with a properly sealed tube, solenoid 256 is not energized, shaft 254 is latched in position, and rocker 232 is rotated clockwise to unseal hose 211 by engagement of roller 239 to track 251.

Operation of track 252 is similar to that of track 251 except that track 252 operates on roller 238 for rotating rocker 232 into its hose clamping position. That is, if hose 211 is unclamped by track 251, track 252 will cause a reclamping of the hose if the gas sensing means discovers that the loaded tube is not hermetically sealed. If the exhaust head 55 and the tube therein are air tight, however, solenoid 258 of track 252 is energized to withdraw plunger into the solenoid thereby unlatching shaft 259. Roller 238 may thus pass freely under track 252, rocker 232 remaining in its hose unclamped orientation.

*Method of operation*

It will be convenient to follow a single electron tube 28 as it is processed on this apparatus of the invention.

At the sealing machine section 12 loading station, indicated by the letter B in FIG. 2, an unsealed electron tube is loaded onto a sealing spindle 83 with the tubulation 32 extending directly upwards. At this station, jaws 109 of the tube holder 102 are open, and roller 160 of the sealing head 35 is disengaged from track 161. The sealing spindle is thus locked from rotation, as described, and the tube 28 can be loaded onto sealing pin 97 with the tube lead-ins 30 properly oriented and inserted into apertures 96 (FIG. 4). At this station, moreover, guide 130 at the lower end of sealing spindle 83 is in engagement with track 131 fixed to the machine section 12 framework.

Turret 14 is indexed and roller 114 of holder 102 engages track 125 and is forced outwardly to lock jaws 109 onto the tube tubulation 32. During the next index, roller 160 of the spindle locking mechanism engages track 161 and is driven inwardly, thereby disengaging key 165 (FIG. 7) on rocker arm 164 from head collar 89 permitting rotation of sealing spindle 83 by the continuously rotating planetary gear system 37. The tube is then conveyed through the sealing cycle wherein flames from the encircling burner tube 36 soften and fuse the bulb 31 to the stem 29.

At the conclusion of the bulb-stem sealing operation, roller 160 disengages track 161, and spring 169 fastened to the end of rocker arm 164 brings key 165 back into engagement with head collar 89 to prevent further spindle 83 rotation. Sealing head 35 is indexed to the sealing turret 14 unloading station indicated by the letter A in FIGS. 1a and 1b. As shown, this station is located directly over the elevating shaft 176 of the transfer mechanism 173, and directly under an exhaust head 55 suspended from the periphery of exhaust turret 15. The sealing turret unloading station is in exact vertical registry with the exhaust turret loading station, and upward movement of sealing spindle 83 causes tubulation 32 of the sealed tube mounted thereon to be inserted into an exhaust head 55.

At this tube transfer station, guide 130 on the lower portion of the sealing spindle 83 disengages track 131 and engages instead the transfer block 182 attached to the upper end of shaft 176 of the transfer mechanism 173. As described, the sealing spindle 83 is elevated within housing 80 by the transfer mechanism, and the sealed tube is transferred to an exhaust head 55.

The tubulation of the tube being transferred is guided into the bore 206 (FIG. 9) of rubber port ring 207, the port ring being non-compressed for permitting entry of the tubulation therein. Tubulation 32 forces ejector plunger 225 into hollow plunger 209, thereby compressing spring 226. Hollow plunger 209 is then activated downwardly by rotation of clamp 218 by air cylinder 224 (FIG. 1b) and the tubulation is firmly and hermetically sealed within the rubber port. Air cylinder 121 then forces roller 114 inwardly to unlock jaws 109 from tubulation 32, and the sealing spindle 83 and shaft 176 are retracted leaving the electron tube suspended by its tubulation from the exhaust head.

If the electron tube 28 is properly sealed, and if the tube is properly inserted into the exhaust head, rocker 232 on the exhaust head is then rotated clockwise by track 251 to unseal hose 211, as previously described.

Exhausting and activating processes are then performed on the tube as it is carried by the exhaust head 55 through the different stations on the exhaust machine. At the end of the exhaust cycle, the tubulation is tipped off and sealed, and the sealed electron tube is allowed to drop from the exhaust machine to a conveyor belt or other removal means. On the next index, clamp 218 is actuated by an air cylinder (not shown) to drive plunger 209 upwardly to decompress the rubber port ring 207. Compressed spring 226 then forces plunger 225 downwardly to drive out the remaining portion of the tubulation and any glass particles from within the exhaust head.

If at the start of the exhaust cycle, the exhaust head 55 were either not properly loaded with an electron tube, or loaded with an imperfectly sealed electron tube, tracks 251 and 252 would operate on rocker 232 as described so that hose 211 of the exhaust head would remain sealed as the exhaust head indexed through the exhaust section processing stations.

What is claimed is:

1. Apparatus for sealing together parts of a hollow article comprising a rotatable turret having an article receiving sealing head mounted thereon, said sealing head including a sealing spindle rotatably mounted therein, means for rotating said spindle, said spindle rotating means being mounted on said turret for rotation therewith, portions of said spindle rotating means being relatively rotatable with respect to said turret, means for intermittently rotating said turret, means stationary with respect to said turret for rotating said portions, said portion rotating means rotating said portions at a faster rate of revolution than said turret is rotated, and speed reduction means coupling said portions with said spindle, whereby said spindle rotates at a relatively constant rate regardless of the rotation of said turret.

2. Apparatus for sealing together parts of a hollow article comprising a rotatable turret having a plurality of article receiving sealing heads mounted thereon, each of said sealing heads including a sealing spindle rotatably mounted therein, said sealing spindles being adapted to support thereon an article being sealed, a planetary gear system mounted on said turret for rotation therewith, said gear system including a sun gear coaxially and rotatably mounted on said turret, a plurality of planet gears meshed with said sun gear, a rotatable shell having an inner ring gear and an outer bull gear, said inner ring gear being meshed with said planet gears for rotating said shell, and said outer bull gear being operably connected to said sealing heads for rotating said spindles, means for intermittently rotating said turret, and drive means stationary with respect to said turret operably connected to said planetary gear system for driving said system.

3. Apparatus for sealing together parts of a hollow article comprising a rotatable turret having a plurality of article receiving sealing heads mounted thereon, each of said sealing heads including a sealing spindle rotatably mounted therein, a planetary gear system mounted on said turret for rotation therewith, said planetary gear system being operably connected to said sealing heads for rotating said spindles, means for intermittently rotating said turret, and drive means stationary with respect to said turret for driving said planetary gear system, said drive means driving portions of said planetary gear system at a faster rate of revolution than said turret is rotated and speed reducing means included in the means coupling said portions with said spindles, whereby said spindles rotate at a relatively constant rate regardless of the rotation of said turret.

4. Apparatus for sealing together parts of a hollow article comprising a rotatable turret having a plurality of article receiving sealing heads mounted thereon, each of said sealing heads including a sealing spindle rotatably mounted therein, said sealing spindles being adapted to support thereon an article being sealed, a planetary gear system mounted on said turret for rotation therewith, said gear system including a sun gear coaxially and rotatably mounted on said turret, a plurality of planet gears meshed with said sun gear, a rotatable shell having an inner ring gear and an outer bull gear, said inner ring gear being meshed with said planet gears for rotating said shell, and said outer bull gear being operably connected to said sealing heads for rotating said spindles, means for intermittently rotating said turret, drive means stationary with respect to said turret for driving said planetary gear system, and drive means connected to a portion of said planetary gear system for rotating said sun gear, said drive means driving said portion at a faster rate of revolution than said turret is rotated, and speed reducing means included in the means coupling said portion with said spindles, whereby said spindles rotate at a relatively constant rate regardless of the rotation of said turret.

5. In an apparatus for exhausting hollow articles, each article having an extending exhaust tubulation, an exhaust head for receiving an article to be exhausted, said exhaust head comprising a housing including a compressible port ring, said port ring having a bore therein for receiving the tubulation of said article, a plunger slidably mounted within said housing and having a bore therein, means for translating said plunger axially of said housing for uniformly compressing said port ring about said tubulation for hermetically sealing said tubulation within said housing, means for adjusting the amount of compression of said port ring by said plunger, an ejector included within the bore of said plunger, and means for forcing said ejector axially of said plunger in response to a decompressive movement of said plunger for ejecting said tubulation from said housing.

6. In an apparatus for exhausting hollow articles, each article having an extending exhaust tubulation, an exhaust head for receiving an article to be exhausted, said exhaust head comprising a housing including a port ring, said port ring having a bore therein for receiving the tubulation of said article, a plunger slidably mounted within said housing and having a bore therein, means for translating said plunger axially of said housing for uniformly compressing said port ring about said tubulation for hermetically sealing said tubulation within said housing, means for adjusting the amount of compression of said port ring by said plunger, an ejector rod included within the bore of said plunger, means for forcing said ejector rod axially of said plunger in response to a decompressive movement of said plunger for ejecting said tubulation from said housing, an exhaust means, and valve and conduit means for connecting said housing to said exhaust means.

7. In an apparatus for exhausting hollow articles, each article having an extending exhaust tubulation, an exhaust head for receiving an article to be exhausted, said exhaust head comprising a housing having a flat surfaced member therein, a compressible port ring included within said housing in contact with said flat surfaced member, said port ring having a bore therein for receiving the tubulation of an article inserted into said housing, a plunger having a flat surface on one end thereof slidably mounted within said housing and biased in preselected longitudinal orientation with respect to said housing, said plunger having a bore therein, means for translating said plunger axially of said housing for uniformly compressing said port ring between said plunger flat surfaced end and said flat surfaced member and about said tubulation for hermetically sealing said tubulation within said housing, and means for adjusting said preselected orientation of said plunger with respect to said housing, an ejector rod included within the bore of said plunger, means for forcing said ejector rod axially of said plunger in response to a decompressive movement of said plunger for ejecting said tubulation from said housing, an exhaust means, and valve and conduit means for connecting said housing to said exhaust means.

8. In an apparatus for exhausting hollow articles, each article having an envelope with an extending exhaust tubulation, an exhaust head for receiving an article to be exhausted, said exhaust head comprising a housing including a housing closure member, said closure member having an aperture therethrough permitting communication with the inside of said housing, and said closure member having a flat surface within said housing, a compressible port ring included within said housing in contact with said closure member, said port ring having a bore therein for receiving the tubulation of an article inserted into said housing through the aperture in said closure member, a plunger slidably mounted within said housing and biased in preselected longitudinal orientation with respect to said housing, said plunger having a bore therein in alignment with the bore in said port ring, means for translating said plunger axially of said housing for uniformly compressing said port ring between said plunger and said flat surface of said closure member and about said tubulation for hermetically sealing said tubulation within said housing, and means for adjusting said preselected orientation of said plunger with respect to said housing, an ejector rod included within the bore of said plunger, means for forcing said ejector rod axially of said plunger in response to a decompressive movement of said plunger for ejecting said tubulation from said housing, an exhaust means, and valve and conduit means for connecting said housing to said exhaust means.

9. In an apparatus for sealing hollow articles which includes at least one sealing head comprising a housing and an article supporting sealing spindle slidably mounted therein, an adjustable spindle elevating mechanism, said elevating mechanism comprising means adapted to engage said spindle for elevating said spindle and an article supported thereon, drive means for actuating said spindle elevating means, a plurality of linkages for coupling said drive means to said elevating means, one of said linkages being coupled to another of said linkages by spring take-up means whereby only a predetermined portion of the motion transmitted from said drive means through said one linkage is conveyed to said other linkage, and an adjustable stop means for controlling said portion of said motion conveyed.

10. In apparatus for sealing and exhausting hollow articles, each article comprising an envelope having an outwardly extending exhaust tubulation and an envelope closure header, the combination of means for fusing the envelope of an article to be processed to its closure header, means including an exhaust head for exhausting said article, means for disposing said article into vertical registry with said exhaust head, and means acting in cooperation with said disposing means for transferring said article to said exhaust head, said transferring means comprising means for moving said article directly upwardly for insertion into said exhaust head, drive means for actuating said translating means, a plurality of linkages for coupling said drive means to said translating means, one of said linkages being coupled to another of said linkages through spring take-up means whereby only a predetermined portion of the motion transmitted from said drive means through said one linkage is conveyed to said other linkage, and an adjustable stop means for controlling said portion of said motion conveyed.

11. An apparatus for sealing hollow articles comprising a rotatable turret having a plurality of sealing heads mounted thereon, each of said sealing heads having an article supporting sealing spindle rotatably mounted therein, a planetary gear system mounted on said turret for rotation therewith, and a plurality of clutch mechanisms operably associated with said sealing heads in a one to one correspondence of said clutch mechanisms to said sealing heads, said planetary gear system being operably engaged with said spindles through said clutch mechanisms for rotating said spindles, each of said clutch mechanisms comprising a housing including a shaft mounted therein, a first gear mounted on said shaft and driven by said planetary gear system, a second gear rotatably mounted on said shaft, means for frictionally coupling said first gear to said second gear, means for adjusting the tightness of frictional coupling between said two gears, and gear means for coupling said second gear to the spindle of said housing in correspondence with said clutch mechanism.

12. An apparatus for sealing hollow articles comprising a turret having a sealing head mounted thereon, a sealing spindle rotatably mounted within said sealing head and adapted for supporting an article to be sealed, gear means mounted on said turret for rotating said spindle, and a clutch mechanism operably connecting said gear means to said spindle, said clutch mechanism comprising a housing including a shaft mounted therein, a first gear mounted on said shaft, said first gear being meshed with said gear means and being driven thereby, a second gear rotatably mounted on said shaft, said second gear being operably engaged to said spindle for rotating said spindle, a plurality of spacer elements mounted on said shaft for frictionally coupling said first gear to said second gear and for positioning said gears along said shaft, and means for moving said shaft axially of said housing for adjusting the frictional coupling between said spacer elements and said first and second gears.

13. An apparatus for sealing hollow articles comprising a turret having a plurality of sealing heads mounted thereon for receiving articles to be sealed, each of said sealing heads comprising a housing fixed to said turret and a sealing spindle rotatably mounted within said housing, gear means mounted on said turret for rotating said spindles, and a plurality of clutch mechanisms operably connecting said gear means to said sealing heads, each of said clutch mechanisms being associated with a different one of said sealing heads, said clutch mechanisms each comprising a subhousing mounted adjacent one of said housings, a shaft mounted within said subhousing, a first gear mounted on said shaft, said first gear being coupled to said gear means and driven continuously thereby, a second gear rotatably mounted on said shaft, said second gear being operably engaged to the spindle within said adjacent housing, a plurality of spacer elements mounted on said shaft for frictionally coupling said first gear to said second gear and for maintaining said gears in axial position along said shaft, and means for moving said shaft axially of said subhousing for adjusting the frictional coupling between said spacer elements and said first and second gears.

14. In an apparatus for exhausting hollow articles, each article having an extending exhaust tubulation, an exhaust head for receiving an article to be exhausted, said exhaust head comprising a rigidly mounted housing including a port ring having a bore therein for receiving the tubulation of said article, a plunger slidably mounted within said housing and being secured to a flexible support means, said plunger having a bore therein and said plunger being disposed within said housing in preselected longitudinal relation with respect to said housing, means for moving said plunger longitudinally of said housing for uniformly compressing said port ring about said tubulation for hermetically sealing said tubulation within said housing, and means for flexing said support means for adjusting the preselected relation between said plunger and said housing for adjusting the amount of compression of said port ring by said plunger upon movement thereof, an ejector rod included within the bore of said plunger, means for forcing said ejector rod longitudinally of said plunger in response to a decompressive movement of said plunger for ejecting said tubulation from said housing, exhaust means, and valve and conduit means for connecting said housing to said exhaust means.

References Cited by the Examiner
UNITED STATES PATENTS

| | | | |
|---|---|---|---|
| 2,023,628 | 12/35 | Van Sant | 53—112 X |
| 2,538,411 | 1/51 | Carter. | |
| 2,567,033 | 9/51 | Schutz | 214—1 |
| 2,613,863 | 10/52 | Louthan et al. | |
| 2,726,799 | 12/55 | Dodge et al. | 53—112 |
| 2,799,982 | 7/57 | Dodge | 53—88 |
| 2,837,396 | 6/58 | Warren | 53—79 X |
| 2,857,723 | 10/58 | Diehl et al. | 53—79 |
| 3,006,058 | 10/61 | Goodwin et al. | 214—1 |

FRANK E. BAILEY, *Primary Examiner.*

ROBERT A. LEIGHEY, TRAVIS S. McGEHEE,
*Examiners.*